United States Patent [19]

Clark

[11] Patent Number: 4,660,045
[45] Date of Patent: Apr. 21, 1987

[54] SYSTEM FOR COMPENSATING POLARIZATION ERRORS

[75] Inventor: John F. Clark, Princeton, N.J.

[73] Assignee: RCA Corporation, Princeton, N.J.

[21] Appl. No.: 543,495

[22] Filed: Oct. 19, 1983

Related U.S. Application Data

[63] Continuation-in-part of Ser. No. 497,895, May 25, 1983.

[30] Foreign Application Priority Data

Jun. 24, 1982 [GB] United Kingdom ................. 8218287

[51] Int. Cl.⁴ ........................ H04B 7/10; H01Q 21/24
[52] U.S. Cl. ..................................... 342/361; 455/295
[58] Field of Search ........ 343/352, 361, 362, 363–366; 455/295

[56] References Cited

U.S. PATENT DOCUMENTS

| | | | |
|---|---|---|---|
| 3,735,266 | 5/1973 | Amitay | 343/361 |
| 4,090,137 | 5/1978 | Soma et al. | |
| 4,220,923 | 9/1980 | Pelchat et al. | 455/295 |
| 4,313,220 | 1/1982 | Lo et al. | 455/304 |

FOREIGN PATENT DOCUMENTS 0026924 3/1981 European Pat. Off.

OTHER PUBLICATIONS

*Systems Technology*, Sep. 1979, No. 32, pp. 38–47, "Frequency Reuse Signal Separation".

Primary Examiner—Theodore M. Blum
Assistant Examiner—Gregory C. Issing
Attorney, Agent, or Firm—Joseph S. Tripoli; Robert L. Troike

[57] ABSTRACT

A method and system is described for use with or in a satellite for compensating for cross coupling of satellite feeder link signals from a first channel of a first linear polarization as received by a first linearly polarized satellite antenna element with adjacent signals from a second channel. The second channel signals are at a generally orthogonal linear polarization. The system includes a second linearly polarized antenna element oriented orthogonal to the first antenna element for sensing the second channel signal, a gain controlled amplifier for reducing the gain of the second channel signal received at the second antenna element in inverse proportion to the sensed amount of cross coupling (depolarization) and adding the reduced gain signals that have been inverted to the first channel signals from said first antenna element.

18 Claims, 7 Drawing Figures $f_U - f_L = 26$ MHz
$f_W - f_L = 13$ MHz
$f_{W2} - f_{W1} \leq 24$ MHz

SYSTEM FOR COMPENSATING POLARIZATION ERRORS

This is a continuation-in-part of application Ser. No. 497,895, filed May 25, 1983.

This invention relates to correcting polarization errors at a satellite and more particularly to a system at the satellite for correcting cross polarization errors in an orthogonal polarization antenna system.

A new satellite service is planned to broadcast video, audio and data service at relatively high power (E.I.R.P. over 50 dbw) to individual homes. This service is referred to as the direct broadcast satellite (DBS) service. The down link frequencies are in the 12 GHz frequency region (about 12.2 to 12.7 GHz) and the feeder link (up-link) is in the 17 GHz frequency region (about 17.3 to 17.8 GHz).

In the direct broadcasting satellite (DBS) service feeder link (up link) in the 17.3–17.8 GHz band, excellent isolation is required, both between alternate copolar channels by frequency discrimination and between adjacent orthogonal partially overlapping channels by antenna polarization discrimination. According to the March 1983 Federal Communications Commission Report and Order under General Docket No. 80-348, the recommended spacing between copolar channels is 26 MHz and between adjacent orthogonal channels 13 MHz. The maximum necessary bandwidth of a channel is 24 MHz and there is a 2 MHz guard band between copolar channels. Each channel center frequency will be at the center of the 2 MHz wide guard band for the adjacent orthogonally-polarized channels.

In precipitation, linear polarization gives better cross polarization discrimination (XPD) than does circular. When the linearly polarized radiation orthogonal axes are aligned with the local horizontal and vertical axes, the XPD advantage for linear polarization is maximized (see NASA Tech. Paper 1770, Feb. 1981, pp. 35–45; also Canadian CPM Contribution B8, May 1982).

For DBS feeder link service from a typical service area (e.g., a U.S. time zone) to the geostationary orbital satellite cluster providing service to that area, the orientation of linearly polarized radiation emanating from various parts of the service area along the local vertical axis will vary by approximately 20° as received at the satellite. The two adjacent partially overlapping signals are not perfectly orthogonal to the wanted signal because they originate, in general, from different locations than does the wanted signal. This has a tendency to produce interference signals. Also, the satellite itself does not remain in a fixed orientation, but may rotate about its yaw axis which is generally close to the boresight axis of the satellite antenna. This rotation of the antenna's plane of polarization causes the partially overlapping uplink signals to produce interference with the wanted signals, whether or not the former are orthogonal to the latter.

In accordance with one embodiment of the present invention a method and a system is described for compensating for the cross coupling of signals, within a first channel of a first sense of polarization as received by a first antenna element oriented to receive the first sense of polarization, from adjacent partially overlapping frequency band channel signals of a second opposite sense polarization. The method includes sensing the adjacent channel signal by a second antenna element adapted to receive the second opposite sense of polarization, sensing the proportion of the cross coupling of the adjacent channel signals of the second polarization at the first antenna element, reducing the amplitude of the adjacent channel signals sensed by the second antenna element to a level which is in proportion to the cross coupling, and differentially summing the reduced amplitude adjacent channel signals with the first channel signals from the first antenna element.

Figure 1:
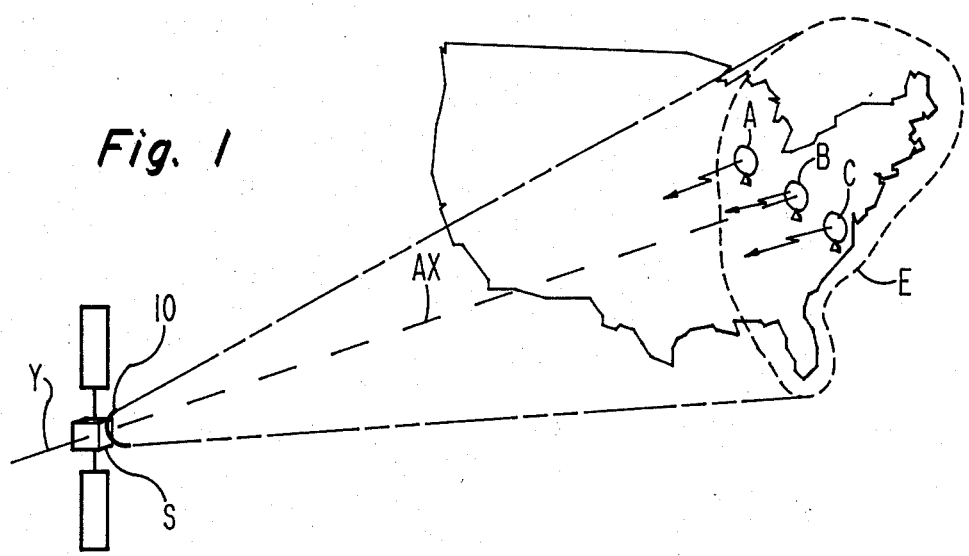
FIG. 1 is a sketch of a given service area with feeder link earth stations and a satellite.

Referring to FIG. 1, there is illustrated three feeder link earth stations A, B, and C in different locations within a given service area E transmitting to the satellite S, which is located above the equator and may be to the southwest of E. The satellite S may be clustered close to other satellites where these other satellites might be designed to receive alternate (second adjacent) coplanar channels and/or the adjacent overlapping crosspolarized channels and service the same area.

Figure 2:
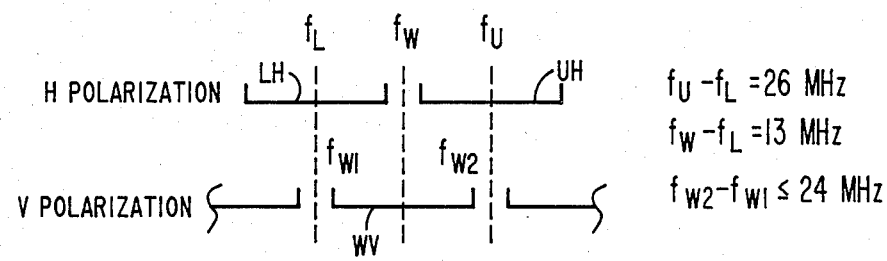
FIG. 2 illustrates the frequency allocation for a satellite feeder link, frequency reuse system using orthogonal linear polarization.

The feeder link earth stations include for example either a horizontally or vertically polarized antenna system operating in the 17.3 to 17.8 GHz band. The spacing between the copolar feeder link channels is, for example, 26 MHz. The bandwidth of each channel is 24 MHz so there is a 2 MHz guard band. The horizontally polarized feeder link channels are, in the example, offset and centered 13 MHz from the adjacent corresponding vertically polarized feeder link channels. Consider for example ground station B radiating the wanted vertically polarized signals $E_{WV}$ in channel WV; ground station A radiating a lower adjacent horizontally polarized signal $E_{LH}$ in overlapping channel LH; and station C radiating the corresponding upper adjacent, horizontally polarized signal $E_{UH}$ in overlapping channel UH. FIG. 2 illustrates the frequency allocation for the various polarizations. For example, there is the horizontal polarization channel LH from station A which has a center of frequency $f_L$, and a frequency spaced alternate coplanar upper horizontal polarization channel UH from station C with a center frequency $f_U$. Between the channel of the horizontal polarization LH and the channel of the horizontal polarization UH there is a 2 MHz guard band with a center frequency $f_W$. Each vertically polarized channel is offset such that the center frequency of the vertically polarized channel is centered at the guard band between the horizontally polarized channels, as represented by frequency $f_W$ at the center of the wanted frequency channel WV which extends between frequency $f_{W1}$ and frequency $f_{W2}$. This feeder link frequency band may be 24 MHz for example in the 17.3 to 17.8 GHz frequency band for the direct broadcast satellite service. Looking at the wanted signal $E_{WV}$ in the wanted vertically polarized channel WV, the interfering signals would be the lower adjacent interfering horizontally polarized signal $E_{LH}$ from, for example, station A and the corresponding upper adjacent horizontally polarized signal $E_{UH}$ from, for example, station C. The satellite feeder link receiver antenna 10 would conventionally be provided with a linear feed oriented parallel to (coplanar with) the desired transmitted signal $E_{WV}$.

The earth station such as station B is on the boresight axis AX of the satellite receiving antenna 10. This antenna 10 is oriented so that its desired receiving antenna polarization orientation to receive the wanted signal $E_{WV}$ is coplanar with that of the local vertical polarization of the antenna at ground station B. The signals received at this satellite receiving antenna polarization orientation are represented as $E_C$. The local horizontal linearly polarized signals $E_{LH}$ and $E^{UH}$ from earth stations off the satellite antenna boresight AX deviate from orthogonality with signal $E_{WV}$ as received by the satellite antenna 10. Signals from station A to the northwest of a local vertical plane through earth station B and satellite S are rotated counter clockwise as viewed from the satellite and signals from earth station C to the southeast are rotated clockwise. The orientation of the polarization of the signal $E_{WV}$ at the spacecraft can vary by as much as 20° or more, as the location of a feeder link earth station is shifted from one edge of the service area E to the other.

In the presence of liquid precipitation, the horizontally polarized component of the transmitted signal of an arbitrarily oriented linear polarization is attenuated more than is the vertically polarized component. Consequently, the polarization of the received signal at the satellite is rotated toward the local vertical as defined at the feeder link station location. The advantage of local vertical polarization is that no polarization rotation occurs in liquid precipitation. The same advantage applies to local horizontal polarization, but the latter signal is attenuated more strongly than is the former.

This received signal polarization rotation during precipitation can introduce significant cross coupling of signals between the horizontal channels and the vertical channels. Also, since the satellite may rotate about its antenna boresight and/or YAW axis Y this apparent polarization rotation introduces significant additional signal cross coupling.

Figure 3:
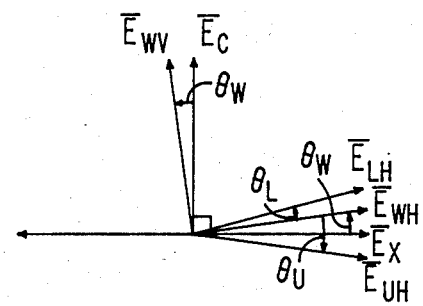
FIG. 3 is a vector diagram illustrating the various polarization angles of the feeder link signals of FIG. 2 as seen at the satellite.

In accordance with one version of the system the vertical linear polarization feed at earth station B, for example, is aligned with the vertical feed axis along the local vertical at station B to transmit the $E_{WV}$ signals at a polarization angle represented by vector $\bar{E}_{WV}$. The earth station B is located at the center of the service area E of the satellite S. With the yaw axis satellite orientation error being zero, the polarization angle of the received signal represented by vector $\bar{E}_C$ is copolar with vector $\bar{E}_{WV}$. The respective polarization angle $\theta_W$ between them as seen at the satellite is zero. A second linearly polarized feed earth station may be located at earth station B oriented along polarization $\bar{E}_{WH}$ orthogonal to $\bar{E}_{WV}$. See FIG. 3. This second linear feed may feed other antennas of satellite S or a satellite in the same cluster as satellite S. $\bar{E}_{WH}$ in FIG. 3 represents the polarization of the signal orthogonal to the wanted signal $E_{WV}$ and at $\bar{E}_{WV}$ and $\theta_L$ and $\theta_U$ represent the respective polarization angles (as seen from the satellite) of the signal $E_{LH}$ at polarization $\bar{E}_{LH}$ from station A and signal $E_{UH}$ at polarization $\bar{E}_{UH}$ from station C relative to signal $E_{WH}$. Signals $E_X$ are those signals at the satellite orthogonal to $E_C$ and have a polarization angle represented by vector $\bar{E}_x$. With a U.S. time zone service area, $\theta_L$ and $\theta_U$ may vary between roughly $-10°$ and $+10°$ on either side of the local vertical as defined at the center of the area of coverage E.

In accordance with the system described herein an electronic rotation of the effective plane of polarization of the satellite feeder link receiving antenna is accomplished, so that it is orthogonal, and therefore unresponsive, to each of the unwanted signals $E_{LH}$ and $E_{UH}$ within their respective frequency channels LH and UH. Since signals $E_{LH}$ and $E_{UH}$ signals from stations A and C are from opposite sides of the local vertical at station B, they are not coplanar. This rotation correction therefore must be accomplished separately for each potentially interfering signal. From FIG. 3, the signals at the satellite $E_C$ and $E_X$ are given by:

$$E_C = E_{WV} \cos \theta_W + E_{LH} \sin (\theta_W + \theta_L) + E_{UH} \sin (\theta_W + \theta_U). \tag{1a}$$

$$E_X = -E_{WV} \sin \theta_W + E_{LH} \cos (\theta_W + \theta_L) + E_{UH} \cos (\theta_W + \theta_U).$$

If these signals are passed through a narrow bandpass filter which passes only $f_L < f < f_W$, the half-channel common to signal $E_{WV}$ and $E_{LH}$, the last term from equations 1a and 1b can be eliminated. If we now subtract a portion $\alpha$ of $E_X$ signal from $E_C$ signal we can obtain a signal $E_{WV}$ free of the lower half channel interference signal $E_{LH}$:

$$E_C - \alpha E_X = E_{WV} [\cos \theta_W + \alpha \sin \theta_W] + E_{LH} [\sin (\theta_W + \theta_L) - \alpha \cos (\theta_W + \theta_L)], \text{ where } \alpha \text{ is the magnitude of that portion. For the coefficient of } E_{LH} \text{ to varnish,}$$

$$\alpha = \sin (\theta_W + \theta_L) / \cos (\theta_W + \theta_L) = \tan (\theta_W + \theta_L),$$

and $$E_C = E_x \tan (\theta_W + \theta_L) = E_{WV} [\cos \theta_W + \sin \theta_W \tan (\theta_W + \theta_L)]. \tag{3}$$

Converting this theory to hardware, the task is to measure the coefficient $\alpha$ in equation (2). This is done by measuring the value of $\tan (\theta_W + \theta_L)$, which is the ratio of the second terms in the right sides of equations (1a) and (1b), respectively. This is done after filtering $E_C$ and $E_X$ through narrow-band filters (several hundred KHz) centered at frequency $f_L$. Because there is no precipitation depolarization of linearly polarized radiation along the local vertical or horizontal planes, coefficient $\alpha$ will be real (rather than complex), and may be either positive (for $\theta_L$ positive) or negative. The gain of the $E_X$ channel is then reduced, (relative to $E_C$) by the factor $\alpha$, and the resulting fraction $\alpha E_X$ is algebraically subtracted from $E_C$, in accordance with equation (3), to give $E_{WV}$ free of $E_{LH}$ between $f_L$ and $f_W$ (determined by appropriate bandpass filters).

Figure 4:
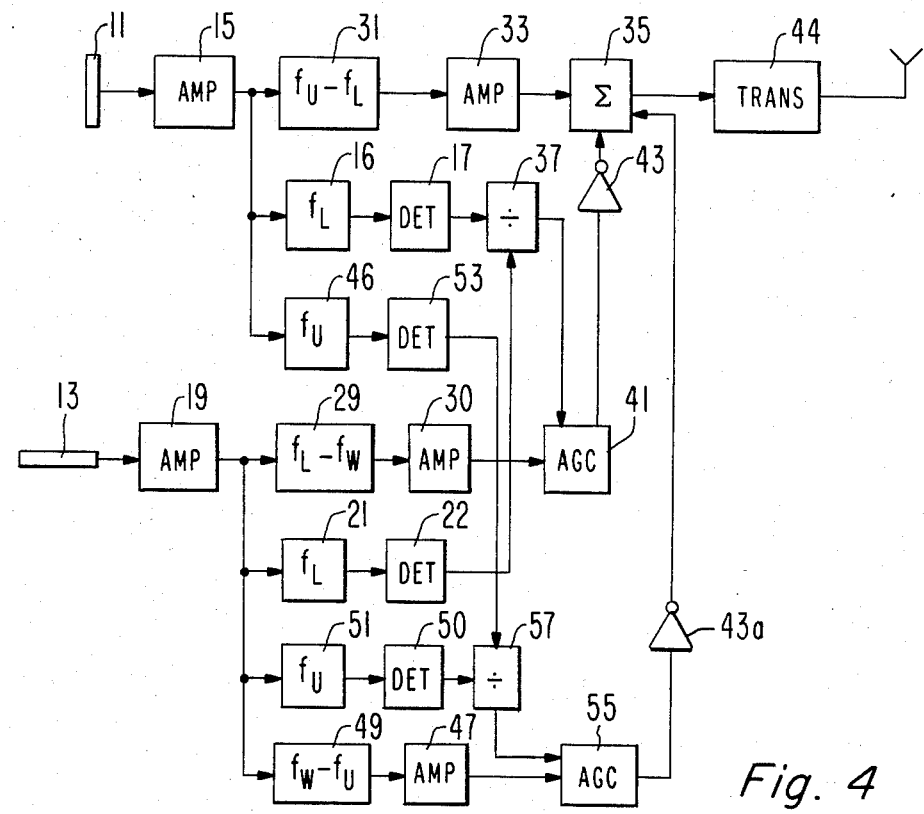
FIG. 4 is a block diagram of a system for compensating or correcting for cross polarization errors according to one embodiment of the present invention.

Turning to FIG. 4 receive feeder link satellite antenna system 10 according to one embodiment is illustrated. The satellite feeder antenna system 10 includes predominantly vertically polarized pick-up element or horn 11 and predominantly horizontally polarized pick-up element or horn 13. The predominantly vertically polarized signal received at horn 11 represented by $E_C$ is amplified by amplifier 15 and those frequencies between $f_U$ and $f_L$ are passed via bandpass filter 31 to amplifier 33. The signals of amplifier 15 are also applied to narrow-band filter 16 which passes frequency $f_L \pm$ several hundred KHz (300 KHz for example) to first ratio detector 17. The feeder link signals are FM modulated to the carrier. The signal picked up at the predominantly horizontally polarized horn element 13 is amplified by amplifier 19 and the $f_L \pm$ several hundred KHz signal is passed via narrow bandpass filter 21 to ratio detector 22. The signal from $f_L$ to $f_W$ is passed by bandpass filter 29 and applied to amplifier 30.

The detected baseband signals (video baseband in the case of television broadcasting) from ratio detector 17 is divided by the detected baseband signal from detector 22 at divider 37 to provide the ratio signal proportional to $\alpha$ in equation 2. This division may be provided at divider 37 by logarithmic amplifiers at the output of each of detectors 17 and 22 to amplify the detected baseband signal, a differential amplifier to differentially sum the two logarithmic signals, and an antilog device coupled to the differential amplifier. The antilog device may be a feedback amplifier with a log amplifier in the feedback path. The output of the divider 37 (at the output of the antilog device in the above example) is therefore equal to $\alpha$, the value of $\tan(\theta_W + \theta_L)$. The detected predominantly horizontally polarized signal from element 13 at $f_L$ to $f_W$ is passed through $f_L - f_W$ bandpass filter 29 and amplified by amplifier 30. This RF signal is applied to AGC amplifier 41 which has a gain factor determined by the divider 37 output ratio signal. The gain of the $E_X$ signal from horn 13 is therefore reduced (relative to the $E_C$ signal from horn 11) by the factor $\alpha$. The resulting fraction $\alpha E_X$ from amplifier 41 is algebraically subtracted from the $E_C$ signal at amplifier 33 at summing means 35 such that in accordance with equation (3), a signal is produced which is equal to the wanted vertically polarized signal $E_{WV}$ free of the cross polarized signals $E_{LH}$ between $f_L$ and $f_W$. The algebraic subtraction may be accomplished by an inverter 43 to invert the signal from amplifier 41 before being applied to the summing means 35 which may be a a summing waveguide. The summed signal at means 35 is then passed through the appropriate satellite transponder 44 for that channel where it is filtered, converted to the down-link frequency and radiated to earth over the area E.

The identical rationale and technique of measuring the coefficient $\beta = \tan(\theta_W + \theta_U)$ within several hundred KHz around $f_U$ is used to obtain $E_{WV}$ free of $E_{UH}$ between $f_W$ and $f_U$.

In FIG. 4, the output from amplifier 15 is applied to narrow band filter 46 for passing the narrow band upper half common frequency signals of $f_U \pm$ several hundred KHz (300 KHz for example) to detector 53. This signal is detected at ratio detector 53 and applied to divider 57. The output from amplifier 19 is also applied to $f_U$ narrow band filter 51 and to $f_W$ to $f_U$ bandpass filter 49. The narrow pass band signals centered at $f_U$ are detected at detector 50 and applied to divider 57. The divider signal representing the ratio of these narrow pass band signals centered at $f_U$ and the coefficient $\beta$ is applied to AGC amplifier 55. The bandpass $f_W$ to $f_U$ signals are amplified by amplifier 47 and are applied to AGC amplifier 55 where the gain of the signals in the $f_W - f_U$ band ($E_X$) is reduced by factor $\beta$. The resulting fraction $\beta E_X$ from amplifier 55 is algebraically subtracted from the detected signal $E_C$ at summing means 35 via an inverter 43a.

The resultant amplitudes of the lower and upper halves of the $E_{WV}$ channel will differ as follows:

$$E_C - E_X \tan(\theta_W + \theta_L) = E_{WV}[\cos\theta_W + \sin\theta_W \tan(\theta_W + \theta_L)] \text{ for } f_L \leq f \leq f_W. \quad (3a)$$

$$E_C - E_X \tan(\theta_W + \theta_U) = E_{WV}[\cos\theta_W + \sin\theta_W \tan(\theta_W + \theta_U)] \text{ for } f_W \leq f \leq f_U. \quad (3b)$$

Figure 4A:
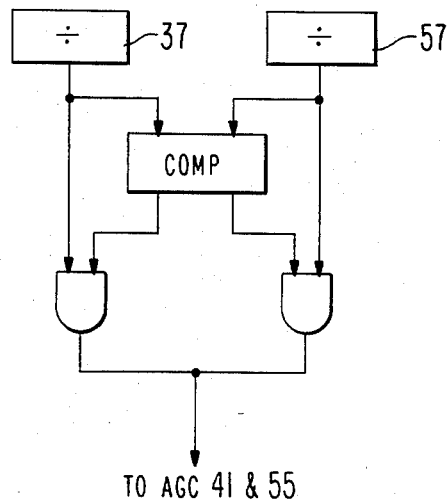
FIG. 4A shows a system for equalizing the amplitudes of the upper and lower sidebands of the system in FIG. 4.

This difference may be eliminated by passing the FM signal through a limiter. Should it be necessary to make this small correction in relative amplitudes to avoid distortion of signal $E_{WV}$, it may be accomplished by computing this ratio from the measured values of $\theta_L$, $\theta_U$ and $\theta_W$ (which may be measured at $f_W$). One way of maintaining equal lower and upper half amplitudes is to compare the divide ratios of the two dividers and to pass the smaller fraction divider ratios as the gain for both AGC amplifiers 41 and 55 as seen in FIG. 4A.

There are several possible alternative techniques available, with advantages and disadvantages. One preferred method is to orient all of the linearly polarized feeder link ground station transmitting antennas so that they are either copolarized or orthogonally polarized as seen from the DBS satellite cluster, with reference to the signal from the center of the service area. For example, the local vertically and horizontally polarized antennas at ground station A in FIG. 1 would be rotated slightly clockwise around a line from the satellite S through A, and the local vertically and horizontally polarized antennas at ground station C would be rotated counterclockwise around a line from the satellite S through C. Since ground station B is at the satellite antenna boresight, the local vertical is defined at B and no correction there is required. This method has the advantage that $\theta_L$ and $\theta_U$ are both zero, and equation (3) becomes:

$$E_C - E_X \tan\theta_W = E_{WV}[\cos\theta_W + \sin^2\theta_W/\cos\theta_W] = E_{WV}\sec\theta_W.$$

A strong additional advantage is that the $E_C$ and $E_X$ axes on the satellite may be chosen to minimize $\theta_W$, using the present invention only to correct for variations of $\theta_W$ as the satellite rotates about its yaw axis Y (generally along the direction of propagation from the satellite antenna to the center of the coverage area). Its disadvantage is that the polarization near the edge of the service area deviates from local vertical by as much as 10°.

Figure 5:
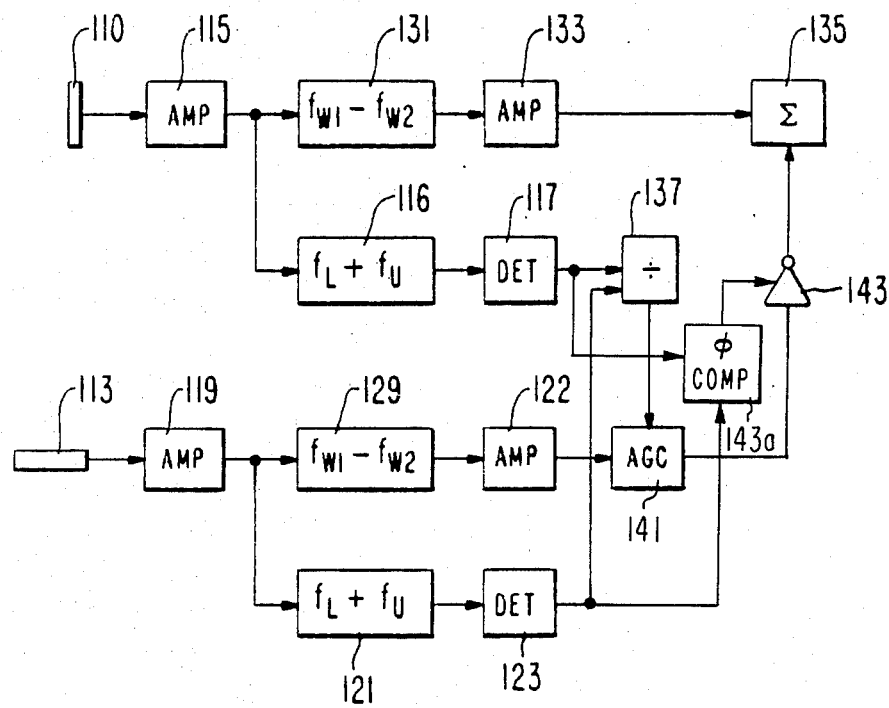
FIG. 5 is a block diagram of a system for compensating for cross polarization errors according to a second preferred embodiment of the present invention.

The preferred system to operate when all of the ground station antennas are copolarized or orthogonally polarized as seen by the DBS satellites is shown in FIG. 5. The predominantly vertically polarized signal of $E_C$ is picked up at antenna element 110 and amplified at amplifier 115. This amplified signal is applied to bandpass filter 131 which passes signals in the wanted passband of $f_{W1} - f_{W2}$ to amplifier 133. The signal at the predominantly horizontal antenna element 113 is amplified at amplifier 119 and applied to filter 129 which passes signals at the same wanted passband of $f_{W1} - f_{W2}$ to amplifier 122. The lower frequency $f_L$ and the upper frequency $f_U$ at amplifiers 115 and 119 are passed via double narrow passband filters 116 and 121 and detected at detectors 117 and 123. The baseband signal from detector 117 is divided at divider 137 by the baseband signal from detector 123 to produce the fractional gain signal applied to AGC amplifier 141. The reduced output from amplifier 141 is inverted at inverter 143 and summed from the detected signal from detector 133 to thereby provide the corrections due to variations of $\theta_W$ as the satellite rotates about its yaw axis.

The present invention may also be used to improve XPD for circular polarization. Here, $\alpha$ becomes a complex ratio, but there is no need to compensate for slow rotation about the yaw axis.

Figure 6:
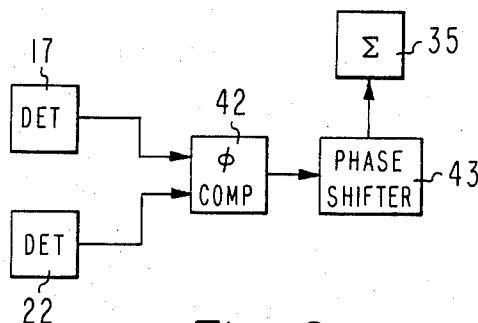
FIG. 6 is a block diagram of a system illustrating the modification of FIG. 4 to provide correction for phase delay.

In the presence of liquid precipitation, the horizontally polarized component of the transmitted signal is also phase delayed more than the vertically polarized component. The amount of phase delay is dependent not only on the amount of precipitation but on the frequency of operation. At the above described uplink frequencies in the 17 GHz band it may be desirable to correct for the phase difference. The higher the frequency of operation the greater the need for correcting this delay. To correct for this phase difference in accordance with one embodiment of the applicant's invention one would detect a difference in delay at the guard band frequencies. For the example of FIG. 4, the detected $f_L$ signals at the vertical polarization guard band from detectors 17 and 22 would be phase compared at a phase comparator 42 (see FIG. 6) and a detected phase difference signal from the output of comparator 42 would be applied to a phase shifter to adjust the phase of the signals summed at the summing means 35. One means of accomplishing this, as shown in FIG. 6, is to make inverter 43 in FIG. 4 a variable phase shifter that provides 180° phase shift decreased in proportion to the sensed phase difference. For example, if the signal of $f_L$ picked up from the horizontal pickup element 13 in FIG. 4 is detected at comparator 42 (shown in FIG. 6) as phase delayed 20° from that signal of $f_L$ picked up from vertical pickup element 11, the phase shift at phase shifter 43 is adjusted to 160° (180° − 20°). Another approach would be to delay the signal from vertical pick-up element 11 at amplifier 33 in FIG. 4 by the amount of the sensed phase difference to equalize the phases at the summing means 35. For the embodiment of FIG. 5, the inverter 143 could be a phase shifter and the outputs from detectors 117 and 123 could be phased compared at phase comparator 143a and the resultant signal applied to adjust the phase of the phase shifter 143.

What is claimed is:

1. A method for compensating for the cross coupling interference in first channel signals having a first sense of polarization as received at a first antenna pick-up means by second channel signals of a second opposite sense of polarization in a frequency reuse by polarization diversity system wherein signals in each of said first and second opposite sense polarizations are in given channels or frequency bands separated by a guard band and said channels in said first polarization are offset in frequency from said channels in said second polarization such that each channel center frequency of the second polarization is provided at the guard band between channels of the first polarization, said compensating method comprising the steps of:

sensing the second channel signals by second pick-up means adapted to receive said second opposite sense polarization;

sensing the ratio of the amplitudes of the second polarization signals at the guard band frequencies adjacent said first channel as received at said second and first antenna pick-up means;

reducing the amplitude of the second channel signals sensed by the second antenna pick-up means in proportion to said ratio; and differentially summing said reduced amplitude second channel signals with said first channel signals received by said first antenna pick-up means.

2. The method of claim 1 wherein said first and second polarizations are linear polarizations.

3. The method of claim 1 wherein said guard band is below said first channel.

4. The method of claim 1 wherein said guard band is above said first channel.

5. The method of claim 1 including sensing the difference in delay of the second polarization signals at the guard band frequencies adjacent said first channel as received at said second and first pick-up means, and wherein said differentially summing includes adjusting the relative phase of said second channel signals received by the second antenna pick-up means to the phase of said second channel signals received by the first antenna pick-up means in proportion to the sensed difference in delay at the guard band frequencies.

6. The method of claim 5 wherein said differentially summing adjusts the relative phase of said second channel signals received by the second antenna pick-up means to the phase of said second channel signals received by the first antenna pick-up means by an amount equal to 180° minus the sensed difference in delay at the guard band frequencies.

7. A system for compensating for cross coupling interference in first channel signals having a first sense of polarization as received by a first antenna pick-up means by second channel signals having a second opposite sense of polarization in a frequency reuse by polarization diversity system wherein signals in each of said first and second opposite sense polarizations are in given channels or frequency bands separated by a guard band and said channels in said first polarization are offset in frequency from said channels in said second polarization such that each channel center frequency of the second polarization is provided at the guard band between channels of the first polarization, said compensating system comprising, in combination:

means including a second antenna pick-up means adapted to receive said second opposite sense polarization for sensing the second channel signals;

means coupled to said first and second antenna pick-up means for providing a gain control signal proportional to the ratio of the second channel signals at the guard band frequencies adjacent said first channel as received at said second and first antenna pick-up means, means coupled to said first and second mentioned means for reducing the amplitude of the second channel signals sensed by the second antenna pick-up means in proportion to said ratio; and means for differentially summing said reduced amplitude second channel signals with said first channel signals received by said first antenna pick-up means.

8. The system of claim 7 including means for sensing the difference in delay of the second polarization signals at the guard band frequencies adjacent said first channel as received at said second and first antenna pick-up means, and wherein said means for differentially summing includes means for adjusting the relative phase of said second channel signals received by the second antenna pick-up means to the phase of said second channel signals received by the first antenna pick-up means in proportion to said sensed difference in delay at the guard band frequencies.

9. The system of claim 8 wherein said means for adjusting the relative phase of said second channel signals includes means for adjusting the relative phase of said second channel signals received by the second antenna pick-up means to the phase of said second channel signals received by the first antenna pick-up means by an amount equal to 180° minus the amount of delay sensed at said means sensing a difference in delay.

10. The combination of claim 7 wherein said first and second polarizations are linear polarizations.

11. The combination of claim 7 wherein said second mentioned means includes means for sensing the guard band below said first channel frequencies.

12. The combination of claim 7 wherein said second mentioned means includes means for sensing the guard band above said first channel frequencies.

13. The combination of claim 7 wherein said second mentioned means includes means for sensing the guard band frequencies above and below said first channel frequencies.

14. A system for compensating for cross coupling interference in first channel signals having a first sense of polarization as received by a first antenna pick-up means at a satellite by second channel signals having a second opposite sense of polarization in a frequency reuse by polarization diversity feeder link system wherein each of said first and second opposite sense polarized signals are in given channels or frequency bands separated by a guard band and said channels in said first polarization are offset in frequency from said channels in said second polarization such that the channel center frequency of the second polarization is provided at the guard band of said first polarization, said compensating system comprising in combination:

means including a second antenna pick-up means adapted to receive said second opposite sense polarization for sensing the second channel signals;

means coupled to said first and second antenna pick-up means for providing a gain control signal proportional to the ratio of the second channel signals at the guard band frequencies adjacent said first channel as received at said second and first antenna pick-up means;

means coupled to said first and second mentioned means for reducing the amplitude of the second channel signals sensed by the second antenna pick-up means in proportion to said ratio; and means for differentially summing said reduced amplitude second channel signals within said first channel signals received by said first antenna pick-up means.

15. The combination of claim 14 wherein said second mentioned means includes means for sensing the guard bands above and below said first channel.

16. The combination of claim 14 wherein said polarizations are linear polarizations.

17. The system of claim 14 including means for sensing the difference in delay of the second polarization signals at the guard band frequencies adjacent said first channel as received at said second and first antenna pick-up means, and wherein said means for differentially summing includes means for adjusting the relative phase of said second channel signals received by the second antenna pick-up means to the phase of said second channel signals received by the first antenna pick-up means in proportion to said sensed difference in delay at the guard band frequencies.

18. The system of claim 17 wherein said means for adjusting the relative phase of said second channel signals includes means for adjusting the relative phase of said second channel signals received by the second antenna pick-up means to the phase of the second channel signals received by the first antenna pick-up means by an amount equal to 180° minus the amount of delay sensed at said means sensing a difference in delay.

* * * * *